March 12, 1940.   A. MAIER   2,193,733
CONTROL DEVICE FOR CHANGE SPEED GEARS OF POWER DRIVEN VEHICLES
Filed Sept. 22, 1936   3 Sheets-Sheet 2
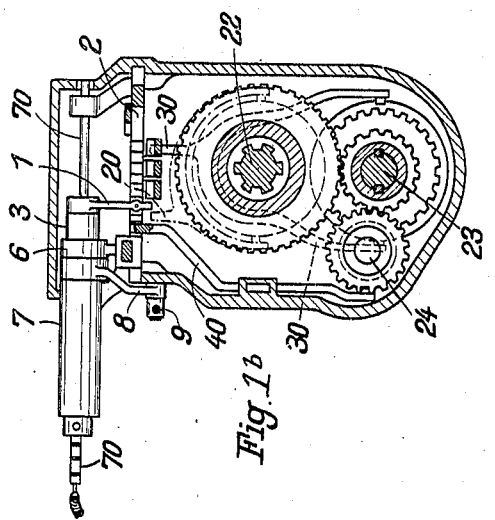
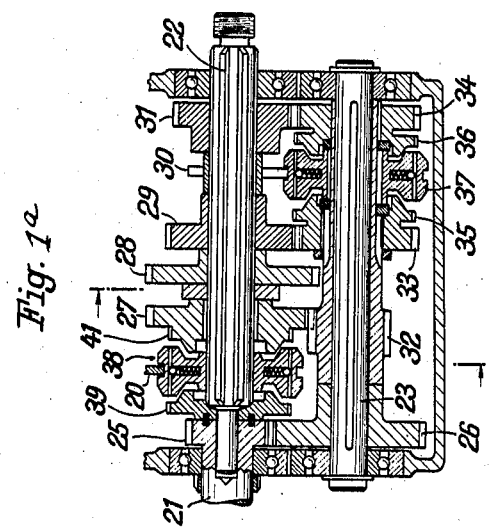
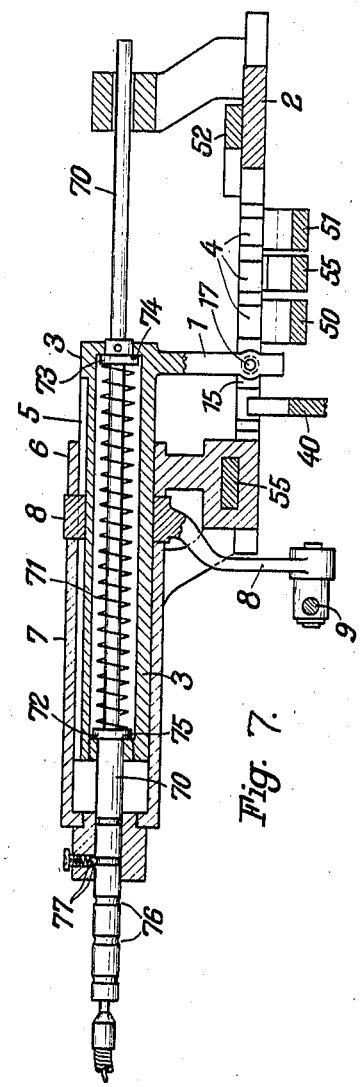
Inventor:
Albert Maier
by S. Sokal.
Attorney

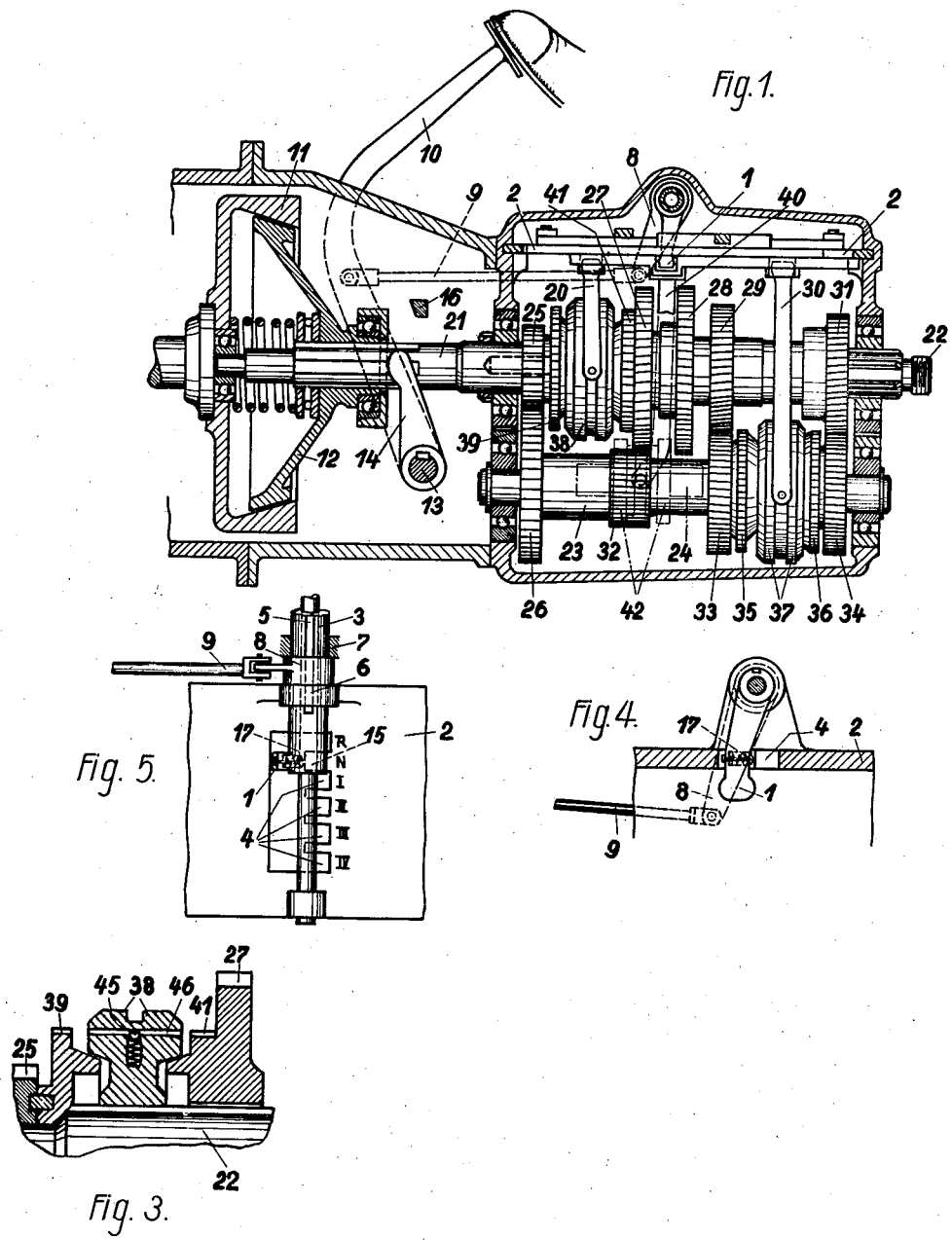

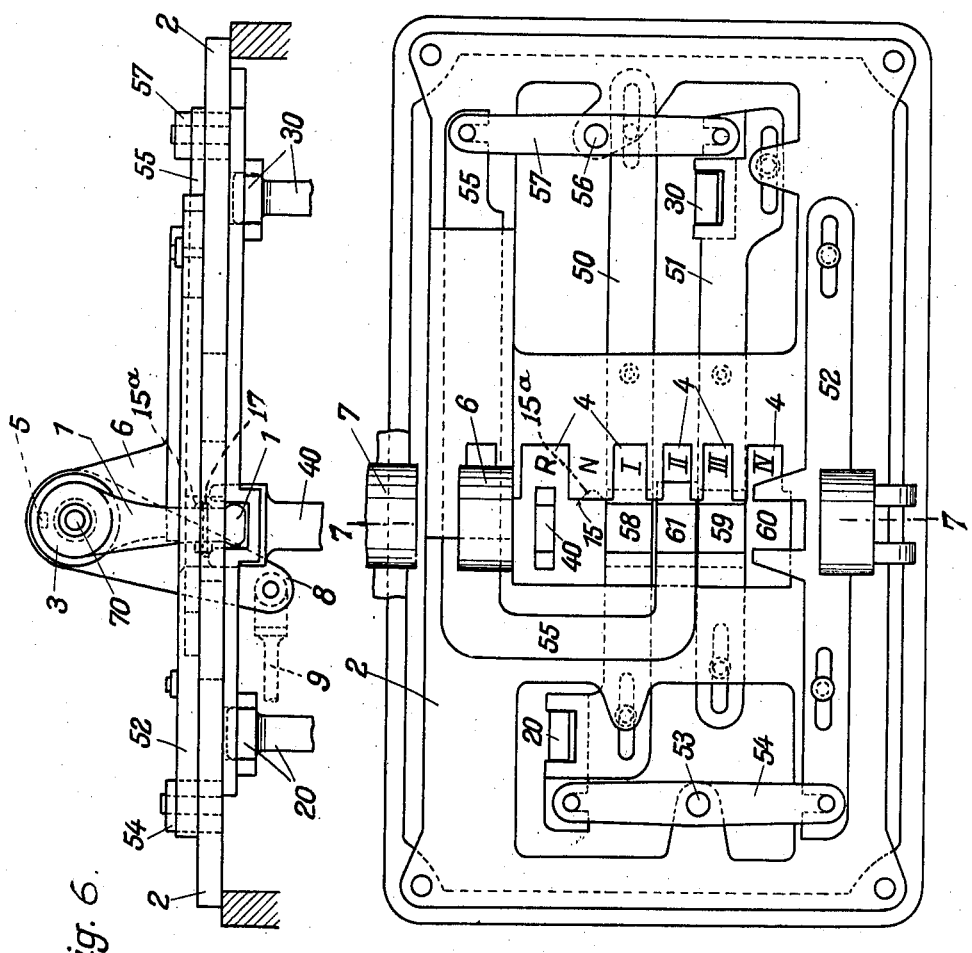

Patented Mar. 12, 1940

2,193,733

UNITED STATES PATENT OFFICE 2,193,733

CONTROL DEVICE FOR CHANGE SPEED GEARS OF POWER DRIVEN VEHICLES

Albert Maier, Friedrichshafen-on-the-Bodensee, Germany, assignor to Zahnradfabrik Friedrichshafen Aktiengesellschaft, Friedrichshafen-on-the-Bodensee, Germany Application September 22, 1936, Serial No. 101,973
In Germany October 7, 1935

4 Claims. (Cl. 74—334)

The invention relates to a control device for change speed gears of power driven vehicles of the kind wherein the speeds are selected by means of a plurality of selector rods actuating striker rods, which selector rods are controlled by a common control lever, which is always moved in the same direction for putting into or out of action the individual speed, and in which the said control lever is coupled with the pedal lever of the motor clutch by a linkage in such a manner that on engaging the motor clutch the desired speed is simultaneously put into action.

The object of the invention is to provide a gear of the above kind which will run as smoothly as possible, and with this object in view the invention provides at a separate point a stop for the control lever of the speed gear in such a manner that in the idle run position of all the gear parts, the motor clutch which has previously been disengaged in order to put out of action the previously employed gear speed, is prevented from being re-engaged until the idle run condition of the gear has been cancelled. Therefore the gear is completely disengaged from the motor during the idle run condition.

In a preferred construction embodying the features of the invention, a part of the frame, provided with selector notches corresponding to the various positions of the control lever, is provided at a suitable point with a stop holding the control lever in the required position whilst the gear parts are in the idle run positions.

The accompanying drawings show a construction embodying the features of the invention, applied to a gear having four forward speeds.

Fig. 1 shows in elevation and partly in section a motor clutch and an adjacent change speed gear provided with the improved control device.

Figs. 1a and 1b are a sectional view and an end view respectively of Fig. 1.

Fig. 2 is a top view to a larger scale of the gear, some parts being omitted for the sake of clearness.

Fig. 3 shows a detail of the gear in sectional elevation.

Fig. 4 shows in sectional elevation the control lever, its connection with the motor clutch pedal lever and some adjacent parts.

Fig. 5 is a top view corresponding to Fig. 4.

Fig. 6 is a longitudinal side view of Fig. 2.

Fig. 7 is a section on the line 7—7 of Fig. 2 and showing the mechanism for moving the control rod to the various speed-engaging positions, and Fig. 8 is a part sectional view of part of Fig. 4, but drawn to a larger scale than that figure.

Referring to the drawings, the control lever 1 is mounted in the usual manner in a frame 2 located under the cover of the gear box and is associated with a speed selecting mechanism. The control lever 1 is integral with the tube 3 which is adjustable transversely with regard to the selector rods and the striker rods and the corresponding selector notches 4. The tube 3 is provided with a longitudinal groove 5 and engages by means of a corresponding key a rocking lever 8 turnably mounted between fixed bearings 6 and 7, so that the control lever 1 can be moved by means of the rocking lever 8.

The tube 3 to which the control lever 1 is fixed is axially movable within the bearings 6 and 7 of the frame 2. Within the tube 3 is a rod 70 on which is a spring 71 as shown in Fig. 7. The spring 71 bears against discs 72 and 73 which are loosely mounted on the rod 70 and limited in their movement in a separating direction by the specially formed ends of the tube 3 and by suitable shoulders 74 and 75 formed on the rod 70. The rod 70 is provided at one end with grooves 76 conforming in number and spacing with the selector notches 4 of the gate part of the frame 2. Connected to the rod 70 is a suitable Bowden control member or the like by means of which the rod can be operated from the driver's seat. Engageable with the grooves are locking members, for example spring-actuated balls 77, mounted in the fixed bearing 7.

It will be understood that the tube 3 performs a dual function. Through movement of the tube in its path across the various selector rods the gear control lever 1 is moved into a position opposite one of the notches 4 in the frame. In any such position the lever 1 is put in operative relation to engage the striker rod for a particular speed. Adjustment of the position of the tube 3 in its path is controlled by the driver through the rod 70. The tube 3 is also rotatable within its bearings to move the gear control lever 1 in a direction longitudinally of the frame to move the selector rods and the striker rods, respectively. As previously explained rotation of the tube 3 and actuation of the lever 1 is effected through the arm 8, the latter being connected to the clutch pedal 10 of the vehicle.

In the construction shown the control device acts upon striker rods 20, 30 and 40 which operate the shiftable clutch parts of the change speed gear referred to hereinafter.

Preferably the striker rods 20 and 30 are actuated by the main selector rods 50 and 51, respectively.

If desired, means may be provided for guiding the striker rods in a path longitudinal to the gear shafts. For example, the striker rod 40 may be guided on the wall of the housing of the change speed gear.

The gear illustrated in the drawings possesses a driven shaft 21 adapted to be coupled to the motor driving the vehicle and with a coaxial shaft 22 which is the driving shaft, and is also provided with a reverse driving shaft 24, and a countershaft 23. Upon the shaft 21 is fixed a gear wheel 25 which meshes with a gear wheel 26 fixed to the counter-shaft 23 and is used for the so-called constant transmission. The driving shaft 22 carries the various other gear wheels, namely the loose gear wheel 27 of the first speed, and the fixed gear wheels 28, 29 and 31. The gear wheel 29 is used for the second speed and the gear wheel 31 for the third speed. The gear wheel 27 meshes with a gear wheel 32 fixed to the counter-shaft 23, whilst the counter-wheels 33 and 34 which mesh with the gear wheels 29 and 31 are loosely mounted upon the counter-shaft 23 and are provided with coupling teeth 35 and 36 respectively by means of which they can be individually coupled with their shaft by the aid of a clutch part 37 slidable upon the shaft by means of a spline and groove connection. Between the shaft 21 and the gear wheel 27 is slidably mounted upon the shaft 22 a clutch part 38 which can be brought into engagement either with the coupling teeth 39 of the gear wheel 25 or with the coupling teeth 41 of the gear wheel 27 mounted upon the shaft 22. Reverse drive is effected by means of a double gear wheel 42 having an annular groove in which engages a striker rod 40. A striker rod 20, which is fork-shaped, engages an annular groove of the clutch part 38. Another fork-shaped striker rod 30 engages the clutch part 37. The clutch parts 37 and 38 and the cooperating coupling members are provided with frictional surfaces which serve in the usual manner for synchronising the parts to be engaged before the actual engagement. The clutch parts consist, in fact, each of two parts which are held together by locking members 45. The outer part is guided by means of coupling teeth 46 in an axial direction so that, on moving the clutch parts either in the one or the other direction, synchronisation is first effected in known manner, whereupon final engagement takes place with the coupling teeth of the part to be coupled. These details are shown in Fig. 3.

The rocking lever 8, which is fixed to the shaft of the control lever 1, is connected by means of a pivoted link 9 with the pedal 10 of the motor clutch 11, 12. The pedal 10 is fixed to a shaft 13 which latter carries a lever 14 acting upon the movable clutch part 12.

The control device consists of a frame 2 arranged on the casing in which are guided the necessary selector rods. If, for example, in the gear illustrated having four forward speeds and one reverse speed, the striker rod 20 for the speeds I and IV and the striker rod 30 for the speeds II and III are to be moved at one time in one direction and at another time in another direction, then the control lever 1, influencing the selector rods 50 and 51, is moved constantly only in one direction. A similar movement is also given to the control lever 1 for engaging the reverse speed, the striker rod 40 being provided for this purpose.

In the selector rods 50 and 51 are arranged suitable notches 58 and 59 into which the control lever 1 can be inserted. An auxiliary rod 52 is provided which is connected to the rod 50 through the medium of a double lever 54 pivotable around a bolt 53. In the same way, an auxiliary rod 55 is connected to the selector rod 51 through the medium of a double lever 57 pivotable about a bolt 56 carried by the frame. The auxiliary rod 52 is provided with a notch 60 for the reception of the control lever 1 and the auxiliary rod 55 is provided with a similar notch 61.

Transversely of the selector rods 50 and 51 and the auxiliary rods 52 and 55 extends a portion of the frame 2 which is formed with control recesses or guides which are arranged corresponding to the particular control positions, that is to say, to the positions of the control lever for engaging the various speeds shown in Fig. 2 by the numerals I, II, III, IV. N indicates the idle run position and R the reverse speed position.

The mechanism operates in the following manner:

Assuming one of the speeds to be in use, then, if the driver desires to change to another speed, it is first necessary to disengage the motor clutch 11, 12 by depressing the pedal 10 whereby the control lever 1 is displaced from the notch 4 pertaining to the particular speed in use at the time. The rod 70 is then displaced across the selector rods until the control lever 1 comes opposite the gate notch corresponding to the desired speed, in which position the lever 1 is secured by means of the locking member 77. When, now, the driver releases the pedal 10 to allow the clutch to re-engage the control lever 1 will simultaneously enter into the respective notch, whereby the selector rod, appertaining to such notch, will be shifted to engage the new speed.

To obtain the first speed, the gear control lever 1 must be brought into the recess 58 of the selector rod 50 in the path of the notch I of the gate frame 2 so that, on rotation of the lever 1 into that notch, the selector rod 50 will be moved rearwardly. With this movement the clutch member 38 (Fig. 1) is brought into engagement with the gear 27 so that power transmission takes place from the driving shaft 21 through the gear wheel 25, gear wheel 26, counter-shaft 23 and via gear wheels 32 and 27 to the driven shaft 22.

For changing to the second speed the control lever 1 must be brought into the recess 61 of the auxiliary selector rod 55. On moving the lever 1 into the notch II the rod 55 is moved rearwardly and simultaneously by means of the two-armed lever 57, the selector rod 51 is actuated to displace the striker rod 30 thereby and causing the clutch part 37 to engage with the gear wheel 33 and power transmission takes place from the driving shaft 21 via the gear wheels 25, 26, the counter-shaft 23 and via the gear wheels 33—29 to the driven shaft 21.

To engage the third speed the control lever 1 is moved into the recess 59 of the selector rod 51 and then rotated so as to enter the notch III, whereby the clutch part 37 comes into engagement with the gear wheel 34 so that now transmission will be effected from the shaft 21 via the gear wheels 25, 26, the countershaft 23 and via the gear wheels 34, 31 to the driven shaft 22.

Fourth speed or direct drive is obtained by setting the control lever 1 in the recess 60 of the auxiliary selector rod 51 and then rotating the lever into the notch IV whereby, by means of the double-armed lever 54, the selector rod 50 actuates the striker rod 20 to cause the clutch part 38 to engage with the gear wheel 25 so that the driven shaft 22 will be coupled directly with the driving shaft 21. For the position of the control lever 1 corresponding to the idle run condition of the gear, a separate projection 15 is provided.

The said projection 15 serves as a stop for the control lever 1, and prevents re-engagement of the previously disengaged clutch part 12. Therefore, the pedal leved 10 cannot be moved in the idle run condition of the gear into its position of rest, in which latter position it bears against the stop 16. The position of the control lever 1 and the clutch pedal 10, in which the latter is prevented from backward movement into the raised position, are shown in Figs. 4 and 5.

In order to lock the control lever 1 in the idle run position, a spring-loaded catch bolt 17 is provided, which on moving the lever 1 from the idle run position shown in Fig. 4 will yield readily, but is sufficiently loaded to prevent accidental movement of the control lever 1 from the said idle run position.

The catch bolt 17 is carried in a bore 80 formed in the control lever 1 which bore 80 is narrowed towards one end. The rounded head of the bolt 17 projects through this narrowed end under the action of a spring 82 which bears at one end thereof against a collar 18 formed on the bolt 17 and at the other end against the screw-plug member 81 which is screwed into the end of the bore opposite the narrow end thereof. The spring 82 surrounds the spindle 19 of the bolt 17, which spindle is guided in the member 81.

A recess 15a is provided in the stop 15 into which the catch bolt 17 of the control lever 1 fits.

I claim:

1. In a power-driven vehicle the subcombination of: a motor clutch having a movable clutch member for engaging and disengaging the clutch; a lever operable by the driver for moving said movable clutch member; a change speed gear having a plurality of selector rods for putting into and out of action individual speeds; a common control lever engageable with said selector rods; means connecting said lever to said driver-operated lever, whereby when the said driver-operated lever is moved to disengage the clutch, said control lever is moved simultaneously to disengage a speed and when said driver-operated lever is moved in the oposite direction to engage the motor clutch, the said control lever is simultaneously moved to engage a speed; a single fixed stop member for holding said control lever in the idle run position of the gear in a position corresponding to the disengaged clutch position of said driver-operated lever, whereby re-engagement of the clutch is prevented in said idle run condition of said gear; and means for locking said control lever in said position.

2. In a power-driven vehicle, the subcombination of: a motor clutch having a movable clutch member for engaging and disengaging the clutch; a lever operable by the driver for moving said movable clutch member; a change speed gear having a plurality of selector rods for putting into and out of action individual speeds; a common control lever engageable with said selector rods; means connecting said lever to said driver-operated lever whereby, when the said driver-operated lever is moved to disengage the clutch, said control lever is simultaneously moved to disengage a speed, and when said driver-operated lever is moved in the opposite direction to engage the motor clutch, the said control lever is simultaneously moved to engage a speed; a single fixed stop member for holding said control lever in the idle run position of the gear in a position corresponding to the disengaged clutch position of said driver-operated lever, whereby re-engagement of the clutch is prevented in said idle run condition of said gear; and a spring-actuated catch bolt for locking said control lever in said position.

3. In a power-driven vehicle, the subcombination of: a motor clutch having a movable clutch member for engaging and disengaging the clutch; a driver-operated lever connected to said movable clutch member; a frame; a change speed gear carried by said frame; a plurality of selector rods mounted in said frame, said rods being operatively associated with said speed gear; a movable common control lever selectively engageable with said selector rods; means operatively connecting said control lever to said driver-operated lever whereby when said driver-operated lever is moved to disengage the clutch, said common control lever is simultaneously moved to move a selector rod to disengage a speed and when said driver-operated lever is moved in the opposite direction to engage said clutch, said control lever is simultaneously moved to move a selector rod to engage a speed; a control gate mounted in said frame above said gears, said gate having a series of guide notches therein corresponding respectively to the speed-engaging positions of said control lever, said notches serving to guide the movement of said control lever; and a projection on said gate adjacent the idle run position of said control lever, said projection serving as a stop to hold said lever in a position corresponding to disengaged position of said clutch; and means for locking said control lever in said position.

4. In a power driven vehicle in combination: a clutch; a change-speed gear having a plurality of speed positions and an idle run position; means operatively connecting said clutch to said change-speed gear such that, on disengagement of said clutch, a speed is disengaged and, on engagement of said clutch, a speed is engaged; a stop device carried by said gear in such a manner as positively to prevent movement of said connecting means in a clutch-engaging direction when said gear is in the idle run position; and a speed preselective device associated with said gear for selecting a speed to be engaged whilst another speed is still in engagement.

ALBERT MAIER.